Patented Oct. 9, 1945

2,386,605

UNITED STATES PATENT OFFICE 2,386,605

TREATMENT OF OIL WELLS

Erskine E. Harton, Jr., Evanston, and Priscilla Lyon, Chicago, Ill., assignors to The Pure Oil Company, Chicago, Ill., a corporation of Ohio No Drawing. Application October 15, 1943, Serial No. 506,350

9 Claims. (Cl. 252—8.55)

This invention relates to treatment of earth bores and is particularly concerned with the treatment of oil and gas wells for removal therefrom of objectionable calcium sulfate deposits which accumulate in the producing strata and around the tubing and/or screening at the bottom of the well.

In certain producing strata, two subterranean streams of water, one of which contains sulfate ions and the other of which contains calcium ions, come together at the bottom of the well with the result that interlacing crystals of gypsum or calcium sulfate are formed which build up into a solid crystalline mass adhering tightly to the tubing or screening at the bottom of the well and clogging the pores of the producing formation. Oil and silt may also be found occluded in the crystalline mass. As the mass builds up, the flow of oil from the well gradually decreases until the well becomes plugged. In order to make the well productive again, it is necessary to clean the well. In the past it has been found necessary to pull the tubing and/or screening and break the deposit therefrom. Ordinary reagents, such as hydrochloric acid are ineffective in removing this type of deposit even when the reagent is hot and agitated. Chemicals such as potassium carbonate, sodium carbonate, sodium phosphate and barium chloride are of no value. Sodium hydroxide disintegrates the deposit to a limited extent, but not sufficiently to be effective.

An object of this invention is to provide a method for removing gypsum or calcium sulfate deposits from the bottom of oil or gas wells.

Another object of the invention is to provide a reagent capable of disintegrating gypsum or calcium sulfate masses which accumulate at the bottom of oil or gas wells.

A further object of the invention is to provide a method and reagent for increasing the flow of oil and gas from producing strata which have become clogged by accumulation of gypsum or calcium sulfate in the pores of the producing strata.

Other objects of the invention will become apparent from the following description:

We have found that concentrated solutions of potassium hydroxide are effective in disintegrating gypsum or calcium sulfate masses which accumulate at the bottom of producing wells around the tubing and/or screening. Concentrated aqueous potassium hydroxide solution when allowed to remain in contact with a calcium mass formed at the bottom of a well causes the mass to disintegrate into a fluffy precipitate of calcium hydroxide without any agitation whatsoever. The fluffy precipitate can be readily bailed from the bottom of the well. In accordance with our invention, aqueous potassium hydroxide solutions containing in excess of 20% and preferably in excess of 40% by weight of potassium hydroxide should be used. The more concentrated the solution, the more readily does the deposit at the bottom of the well disintegrate. A solution containing approximately 52.6% by weight of potassium hydroxide will completely disintegrate the gypsum in nineteen hours or less. Our invention, therefore, contemplates solutions containing from 20% of potassium hydroxide to the maximum amount of potassium hydroxide which is soluble in the solution, although we prefer to use solutions which are not too viscous to be readily handled. The potassium hydroxide solution may be injected into the well to be treated in any desired manner and allowed to remain in the bottom of the well for a period of approximately two hours to five or six days, after which the disintegrated mass and resulting solution may be bailed out of the well. If desired, hydrochloric acid or other mineral acid may be injected into the well after essentially all of the disintegrated mass has been bailed out, in sufficient quantity to neutralize any remaining potassium hydroxide solution. It may be desirable in sandstone oil producing strata to water-wash and neutralize with acid after the potassium hydroxide treatment in order to remove all alkali from the well, since alkali acts very slowly as a cementing material for sand and sandstone.

One manner in which the potassium hydroxide solution may be injected into the well is to first fill the well with oil and then charge the potassium hydroxide in the required amounts into the well. The potassium hydroxide solution, because of its higher specific gravity, will fall to the bottom of the well and will be subjected to the pressure of the column of oil above it. Where it is desired to have the solution penetrate the producing strata, additional oil may be forced into the well after the injection of the potassium hydroxide solution, in order to create additional pressure on the solution at the bottom of the well.

The amount of potassium hydroxide solution required to be used should be sufficient to completely cover the deposit which it is desired to disintegrate and the potassium hydroxide content of the solution should be at least sufficient to react with all the calcium in the deposit on the tubing and/or casing, to form calcium hydroxide.

Slugs of potassium hydroxide solution in amounts of from 200 to 1000 gallons, depending upon the size of the well and the amount of accumulation of gypsum at the bottom of the well, may be used. The solution should be used in sufficient amount to completely cover the deposit on the tubing and/or casing.

In order to compensate for the brine which accumulates at the bottom of the well, it is desired to use potassium hydroxide solutions of high concentration since the brine cuts down the concentration thereof. A concentration of potassium hydroxide should be used such that when mixed with the brine at the bottom of the well, the resulting potassium hydroxide content will not be less than approximately 20%.

In order to demonstrate the efficacy of potassium hydroxide solution in disintegrating gypsum deposits such as are produced in oil wells, samples of gypsum were treated with various concentrations of potassium hydroxide solution, both mixed and unmixed with brine. The gypsum for these experiments was obtained from the tubing withdrawn from the bottom of an oil well. Experiments were made by placing weighed masses of the gypsum in the potassium hydroxide solution and allowing the mass to stand at room temperature without agitation for a period of time, then decanting the solution, washing the undisintegrated mass with water, drying it and again weighing it. Results obtained are tabulated in the following table:

Table

| KOH Solution | | Cc. of brine | Weight of gypsum sample in grams | Hrs. of contact between sample and KOH sol. | Percent of sample disintegrated |
|---|---|---|---|---|---|
| C. c. used | Percent conc. | | | | |
| 100 | 52.6 | | 11.2725 | 19 | 100 |
| 100 | 42.5 | | 25.7450 | 22.5 | 82.4 |
| 60 | 52.6 | 30 | 2.1143 | 16.5 | 100.0 |
| 60 | 42.5 | 30 | 4.2447 | 16.5 | 69.7 |
| 60 | 28.3 | 30 | 5.4530 | 16.5 | 27.1 |
| 60 [1] | 33.3 | 30 | 4.4107 | 16.5 | 1.6 |

[1] NaOH.

From the table it is apparent that the more concentrated the KOH solution, the more readily it disintegrated the sample.

In order to demonstrate the difference in effectiveness between potassium hydroxide and sodium hydroxide solution, one example of treatment with sodium hydroxide is included in the table. Although the sample treated with sodium hydroxide was smaller than the sample treated with the same quantity of potassium hydroxide solution of lower concentration, the sample treated with the sodium hydroxide solution only disintegrated to the extent of 1.6% as compared to 27.1% of the sample treated with potassium hydroxide solution.

Although concentrated potassium hydroxide solution is effective for disintegrating gypsum deposits at atmospheric temperatures or at temperatures naturally occurring at the bottom of well bores, without agitation, the potassium hydroxide may be used at elevated temperatures up to the boiling point of the potassium hydroxide solution and agitation may be resorted to to speed up the rate of disintegration of the deposit.

Our invention makes possible the cleaning of tubing and screen at the bottom of a producing well without the necessity of pulling the tubing and screen, thereby saving time and the expense involved in pulling the tubing and screen and replacing it in the well. In addition, our invention increases the flow from producing formations by disintegrating the gypsum deposits which form in the pores of the producing formation, thereby permitting the oil or gas to flow from the formation into the well bore.

It is claimed:

1. The method of disintegrating calcium sulfate deposits at the bottom of earth bores which comprises contacting said deposits with concentrated aqueous potassium hydroxide solution containing at least 20% by weight of potassium hydroxide.

2. Method in accordance with claim 1 in which the potassium hydroxide solution contains sufficient potassium hydroxide to react with substantially all the calcium in the deposits to form calcium hydroxide and the volume of solution used is sufficient to entirely cover said deposits.

3. Method in accordance with claim 1 in which the deposits are contacted with the potassium hydroxide solution for at least two hours.

4. The method of disintegrating a mass of gypsum in an earth bore which comprises contacting the gypsum with concentrated aqueous potassium hydroxide solution containing at least 20% by weight of potassium hydroxide, in quantity sufficient to cover the mass and allowing the solution to remain in contact with the mass until it has disintegrated to a fluffy powder.

5. Method in accordance with claim 4 in which the solution contains approximately 52.6% by weight of potassium hydroxide.

6. The method of removing calcium sulfate deposits from tubing and screening at the bottom of earth bores comprising bringing into contact with said deposit at the bottom of said earth bore an aqueous potassium hydroxide solution containing in excess of 40% by weight of potassium hydroxide and allowing said solution to remain in contact with said deposits until it is disintegrated.

7. Method in accordance with claim 6 in which the solution contains sufficient potassium hydroxide to react with substantially all the calcium sulfate deposited on said tubing and screening to form calcium hydroxide and the volume is sufficient to entirely cover said deposited calcium sulfate.

8. Method in accordance with claim 6 in which residual potassium hydroxide is neutralized after the deposit is sufficiently disintegrated.

9. Method in accordance with claim 6 in which the potassium hydroxide solution is contacted with the deposit at elevated temperatures below the boiling temperature of the solution.

ERSKINE E. HARTON, Jr.
PRISCILLA LYON.